United States Patent Office 3,220,865
Patented Nov. 30, 1965

3,220,865
CELLULOSE ACETATE BUTYRATE EMULSION COATING
Charles H. Coney, Kingsport, Tenn., assignor to Eastman Kodak Company, Rochester, N.Y., a corporation of New Jersey
No Drawing. Filed June 23, 1961, Ser. No. 119,050
2 Claims. (Cl. 106—170)

This invention concerns cellulose ester emulsion coatings, more particularly cellulose acetate butyrate emulsion coatings for use on wood surfaces.

Cellulose esters have been used as a basis for lacquers and coatings in general for wooden surfaces and for various ornamental coatings. These have been based both on nitrocellulose, cellulose acetate butyrate and the like and normally comprise a cellulose ester a suitable organic solvent and additives such as plasticizers and the like. However, it has been necessary to provide various fillers, sealers and the like, as part of a sequence of operations to provide a satisfactory coating on the wooden surface.

The fillers have normally been linseed oil fillers which were employed to fill the pores of the wood prior to the application of the sealer coat and top coats. The filler had to be forced into the pores of the wood and required a high non-volatile content in order to prevent subsequent shrinkage upon the evaporation of the solvent which would result in depressions in the filled surface. These linseed oil fillers could not be replaced with cellulosic solutions which would have too high degree of viscosity or high non-volatile to permit ease of application by rubbing or padding the filler into the wood surface with a coarse cloth by the usual methods.

Linseed oil fillers have been objectionable in that they continue to oxidize upon aging, becoming more brittle and short. Such compounds have poor resistance to cracking due to the dimensional changes in the wood when exposed to sudden changes in temperature. Thus they have poor cold check resistance, as illustrated by the cracked surfaces of old varnished furniture. In addition, linseed oil fillers are very susceptible to lifting due to the solvent action of subsequently applied coats. After having oxidized to form a solid composition, linseed oil has a high molecular weight, thus resulting in poor compatibility with cellulosic film formers, and producing a weak link in the wood finishing system. For this reason, it is the practice that the oil base filler be wiped from the surface of the wood in order that it might not weaken the finishing system any more than necessary.

Oil fillers are known to darken on aging, especially on exposure to sunlight. Such fillers will also cause a darkening of the wood due to a solvent action upon certain components in the natural wood. Oil fillers also dry by oxidation which requires several hours to convert to a gel state. Thus, in order to prevent absorption of the liquid into the wood, leaving depressions at the pores, it is required that a solid pigment-like material be incorporated into the oil which will, by capillary attraction, tend to hold the liquid in position.

It has been desired to find a cellulosic base wood filler which could be applied easily to wood and which would avoid the undesirable characteristics of previously used linseed oil base fillers. It has also been desired to provide a wood filler which would also function as a filler and sealer permitting application as a single coat, not only producing a filling action for the pores but also producing a continuous film over the entire surface of the wood. This composition should also be capable of taking pigmentation with certain lubricious pigments such as zinc stearate, thus functioning as a sanding sealer.

It has also been desirable to provide a wood filler which would be resistant to ultraviolet light degradation and in which could be incorporated ultraviolet inhibitors which would protect lacquered objects against discoloration in their natural color or in a color of the bleached wood.

Nitrocellulose base lacquers which have normally been used in the furniture finishing industry have employed solvents which are extremely volatile and present a fire hazard. For this reason it has also been desirable to have cellulose ester emulsions which would be useful for finishing furniture but which would provide much less risk of fire hazard.

We have discovered a cellulose acetate butyrate wood filler emulsion which has a heavy cream-like consistency and which is easily applied with a cloth or by dilution. It also may be sprayed onto the surface and the emulsion rubbed into the surface.

One object of this invention is to provide a cellulose ester emulsion wood filler. A further object of this invention is to provide a wood filler which will function as both a filler and sealer. An additional object is to provide a wood filler which has good resistance to ultraviolet degradation. Another object is to provide a wood filler which may be modified and plasticized. An additional object is to provide a wood filler having a lighter initial color than that of previously used linseed oil fillers. The above objects are obtained by combining the following components.

| Ingredients: | Weight percent |
|---|---|
| Cellulose acetate butyrate | 10–27 |
| Dimethylphthalate | 4–15 |
| Toluene | 13–30 |
| Ethyl alcohol | 3–9 |
| 2-ethylhexylacetate or isohexylacetate | 6–15 |
| Anionic surfactants | 0.5–3 |
| Nonionic surfactants | 0.3 |
| Water | 20–40 |

The composition is emulsified in disperse phase in water through the medium of the surfactants. The solution is put under a rapid and high degree of sheer while a small amount of water is added. A stable emulsion results which has a cream-like consistency and is easily applied with a cloth or by dilution. It may be sprayed onto the surface or it may be rubbed into the wood during the normal padding operation. A film forms almost immediately under a slight pressure of the hand which film is sufficiently soft and pliable that it may be smoothed and forced into the wood pores. The film also maintains a very lubricious surface so that it is not difficult to rub, and the rag or other agent used for rubbing does not tend to drag and pull the film from the pores of the wood. High sheer may be applied to the emulsion mixture by passing through a homogenizer.

Other plasticizers than dimethyl phthalate may be used such as diethyl phthalate, dibutyl phthalate, and the like. The cellulose acetate butyrate used can have a butyryl content of from 26 to 48%, an acetyl content of from 20 to 6%, from 2.5 to 0.7% free hydroxyl on a cellulose basis and a viscosity of 0.1 to 20 seconds. Also, the surfactants may be of compositions and types different from those mentioned above. Also, it is possible to modify the emulsions with various resins to increase non-volatile and alter film properties.

The following examples are illustrative of our invention but are not intended to limit it in any way.

*Example 1*

A solution was made of the following ingredients by stirring.

Ingredients: Grams
- Cellulose acetate butyrate _____ 22
- Dimethyl phthalate _____ 9
- Toluene _____ 25
- Ethyl alcohol, 95% _____ 6
- 2-ethylhexyl acetate _____ 10
- Alipal CO–436 _____ 1
- Igepal CO–630 _____ 1

This solution was then put under a rapid and high degree of sheer and 26 grams of water slowly added. A viscous, stable emulsion resulted. This emulsion was rubbed onto a wood surface with a cloth applying a sufficient amount to fill the pores. After drying for several hours, the surface was sanded with stearated paper, lacquer top coats applied, and the surface finished in the customary manner. The emulsion stability is good for at least several months.

*Example 2*

The emulsion prepared in Example 1 was applied with a cloth to a wood surface in three separate applications allowing to dry after each application. When this system was completely dry, the surface was buffed lightly with fine steel wool and a polishing wax applied. A very attractive finish was obtained.

*Example 3*

To the solution in Example 1 was added 0.5 gram of burnt sienna (an iron oxide pigment). This was then emulsified with 26 grams of water as described. This emulsion was applied to wood as a filler, over which the clear emulsion top coat, as prepared in Example 1, was applied.

*Example 4*

To the solution in Example 1 was added 1 gram of zinc stearate. The solution was then emulsified with 26 grams of water as described. This emulsion was applied as the filler and sealer portion of a wood finish. Sanding was improved by the addition of the zinc stearate. A top coat was then applied.

*Example 5*

To the solution in Example 1 was added 5 grams of Santocel C (a siliceous extender pigment) and the whole emulsified with 26 grams of water as described. This emulsion could be applied, but without the same degree of ease as that in Example 1.

*Example 6*

A solution was prepared of the following ingredients.

Ingredients: Grams
- Cellulose nitrate _____ 22
- Dimethyl phthalate _____ 9
- Toluene _____ 25
- Ethyl alcohol, 95% _____ 6
- 2-ethylhexyl acetate _____ 10
- Alipal CO–436 _____ 1
- Igepal CO–630 _____ 1

This was emulsified with 26 grams of water as described in Example 1 and the emulsion then applied with a cloth to wood. A clear, continuous coating was obtained. After several days, however, the emulsion began to separate.

*Example 7*

A solution was prepared of the following ingredients.

Ingredients: Grams
- Ethyl cellulose _____ 22
- Dimethyl phthalate _____ 9
- Toluene _____ 25
- Ethyl alcohol, 95% _____ 6
- 2-ethylhexyl acetate _____ 10
- Alipal CO–436 _____ 1
- Igepal CO–630 _____ 1

This was emulsified with 26 grams of water as described in Example 1 and the emulsion applied to form a clear, continuous coating. After several days the emulsion had separated.

*Example 8*

To ten parts of the emulsion prepared in Example 1 was added one part of a 3% solution of methyl cellulose. This produced an emulsion of higher viscosity and perhaps will produce greater emulsion stability. Ease of application was unaffected.

*Example 9*

In the solution described in Example 1, the 2-ethylhexyl acetate was replaced with 2-ethylisohexyl acetate. The solution was emulsified and applied to wood in the prescribed manner, and it was found to form a clear, continuous film. This solvent seems to be more active and may require a reduced amount in order to produce the ease of padding obtained with the 2-ethylhexyl acetate.

*Example 10*

Example 1 was repeated except that the nonionic surfactant, Igepal, was omitted. A stable emulsion with good application properties was obtained.

*Example 11*

In the emulsion preparation described in Example 1, the dimethyl phthalate plasticizer was replaced with the diester of adipic acid and neopentyl glycol. A stable emulsion could not be obtained.

*Example 12*

In the emulsion preparation described in Example 1, the dimethyl phthalate was replaced with diethyl phthalate. A stable emulsion was obtained; the emulsion had good application properties; and a clear, homogeneous film was obtained.

*Example 13*

In the emulsion preparation described in Example 1, the dimethyl phthalate was replaced with an equal amount of dibutyl phthalate. A low viscosity, stable emulsion was formed. The film was very fast in formation and required approximately 120° F. temperature during the drying process in order to give a clear and homogeneous appearance.

*Example 14*

The following solution was prepared:

Parts by weight
- Half-second butyrate _____ 22
- Dimethyl phthalate _____ 7
- 2-ethylisohexyl acetate _____ 12
- Toluene _____ 25
- Ethyl alcohol, 95% _____ 6
- Alipal CO–436 _____ 1
- Igepal CO–630 _____ 1

This solution was emulsified in 26 parts of water to form a very stable emulsion having good application and film forming properties.

*Example 15*

The following solution was prepared:

Parts by weight
- Half-second butyrate _____ 22
- Dimethyl phthalate _____ 4
- Toluene _____ 25
- Ethyl alcohol, 95% _____ 6
- 2-ethylisohexyl acetate _____ 15
- Alipal CO–436 _____ 1
- Igepal CO–630 _____ 1

This solution was emulsified in 26 parts of water to produce a stable emulsion having good application and film forming properties thus illustrating the possibility of reducing the plasticizer if an increase is made in the amount of high-boiling solvent.

In following the above examples, it may be found that the filler will form a smooth surface on wood. The film thus produced has excellent adhesion to the wood and provides a very good anchor for subsequent coats since the surface of the filler film is softened to some extent by lacquer type solvents and since the compatibility of the lacquer for the filler is greater. The wood thus filled is ready for subsequent treatment within a very short time. Also, the filler will produce a completed system which is lighter in color and which will not darken on aging as will a linseed oil or oil modified resin. This filler may be modified with plasticizers to produce any desired degree of softness and flexibility and with colored pigments to give various optical effects and with zinc stearate to increase the ease with which it may be sanded so that when a continuous film is applied over the surface, it may function as a sanding sealer. Examination under magnification shows that the solvation of certain staining or dyeing compounds present in certain woods such as walnut does not occur with the present invention. However, the slow drying, oil-base wood finishing compositions will dissolve these dark compounds and produce a dark finish. These stained areas become apparent under the microscope. This emulsion coating will function as filler, sealer and top coat, thus permitting the simultaneous application of a complete finishing system with a cloth.

The use of a slow evaporating solvent is necessary to form a clear, homogeneous film. For this purpose, 2-ethylhexyl acetate was found to be most satisfactory. However, in some cases a film having a slightly white appearance which was obtained when using other solvents, such as the methyl ether of ethylene glycol acetate, butyl lactate or the butyl ether of ethylene glycol, may be satisfactory for certain applications. Solvents similar to 2-ethylhexyl acetate, such as ethylisohexyl acetate and others, function in the same capacity. Plasticizers less active than the dimethyl phthalate, such as diethyl phthalate or dibutyl phthalate, may be used but with a sacrifice in the film formation properties in the emulsion.

The nitrocellulose used in the examples had a nitrogen content of 11.8–12.2% and a viscosity of 3–4 seconds at 20% concentration as determined by ASTM D-301–50. The cellulose acetate butyrate used in the examples had a butyryl content of approximately 37%, an acetyl content of 13% and 2% free hydroxyl on a cellulose basis and having a viscosity of 0.5 second as determined by the falling ball method (ASTM D-1343–54T). The methyl cellulose had a methoxyl content of 27.5–32% and a viscosity of 4,000 cps. (2% in water at 28° C.). The ethyl cellulose used in the examples had an ethoxy content of 47.5–49% and a viscosity of 14 cps. determined at 5% in an 80/20 toluene/ethanol mixture at 250° C. The Alipal surfactant used in the examples is a sulfate ester of an alkyl phenoxypolyoxyethylene ethanol. The Igepal surfactant has a composition of ethylene oxide condensation product with nonyl phenol.

The invention has been described in detail with particular reference to preferred embodiments thereof, but it will be understood that variations and modifications can be effected within the spirit and scope of the invention as described hereinabove, and as defined in the appended claims.

I claim:

1. A stable oil-in-water emulsion composed of a continuous aqueous phase and a disperse phase, said emulsion essentially consisting of 20 to 40 parts by weight of water, 10 to 27 parts by weight cellulose acetate butyrate having a butyryl content of from about 26 to 48%, an acetyl content of from about 20 to 6%, a free unesterified hydroxyl content of from 2.5 to 0.7% and a viscosity of from about 0.1 to about 20 seconds; 4 to 15 parts by weight dimethylphthalate; 13 to 30 parts by weight toluene; 3 to 9 parts by weight ethyl alcohol; 6 to 15 parts by weight of a compound selected from the group consisting of isohexylacetate and 2-ethylhexyl acetate; 0.5 to 3 parts by weight of a sulfate ester of an alkyl phenoxypolyoxyethylene ethanol and 0.3 part by weight of the condensation product of ethylene oxide with nonyl phenol.

2. A stable oil-in-water emulsion having an aqueous phase and a disperse phase, said emulsion consisting essentially of:
 (a) 20–40 parts by weight water,
 (b) 10–27 parts by weight cellulose acetate butyrate having a butyryl content of 26–48%, an acetyl content of 6–20%, a free hydroxyl content of 0.7–2.5% and a viscosity of 0.1–20 seconds,
 (c) 4–15 parts by weight of a compatible plasticizer,
 (d) 13–30 parts by weight toluene,
 (e) 3–9 parts by weight ethyl alcohol,
 (f) 6–15 parts by weight of a compound selected from the group consisting of isohexylacetate and 2-ethylhexyl acetate,
 (g) 0.5–3.0 parts by weight of a sulfate ester of an alkyl phenoxy polyoxyethylene ethanol, and
 (h) 0.3 part by weight of the condensation product of ethylene oxide with nonyl phenol.

References Cited by the Examiner

UNITED STATES PATENTS

| | | | |
|---|---|---|---|
| 2,186,454 | 1/1940 | Gloor | 117—73 |
| 2,198,669 | 4/1940 | Jenett et al. | 106—185 |
| 2,291,284 | 7/1942 | Lowell | 106—185 |
| 2,357,458 | 9/1944 | Clough | 106—176 |
| 2,368,062 | 1/1945 | Bogin | 106—176 |
| 2,406,658 | 8/1946 | Bogin | 106—185 |
| 2,776,904 | 1/1957 | Brown | 106—170 |
| 2,804,073 | 8/1957 | Gallienne et al. | 106—183 |
| 2,819,983 | 1/1958 | Salo | 117—73 |
| 2,843,504 | 7/1958 | Salo | 117—85 |
| 2,843,583 | 7/1958 | Voris | 106—170 |

ALEXANDER H. BRODMERKEL, *Primary Examiner.*

RICHARD D. NEVIUS, MORRIS LIEBMAN,
*Examiners.*